(12) United States Patent
Flon

(10) Patent No.: US 6,169,790 B1
(45) Date of Patent: *Jan. 2, 2001

(54) METHOD OF RESTRICTING THE DURATION OF TELEPHONE CALLS AND TELEPHONE IMPLEMENTING SUCH A METHOD

(75) Inventor: Stéphane Flon, Le Mans (FR)

(73) Assignee: U.S. Philips Corporation, New York, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/959,215

(22) Filed: Oct. 28, 1997

(30) Foreign Application Priority Data

Nov. 6, 1996 (FR) .................................... 96 13533

(51) Int. Cl.$^7$ .................................... H04M 15/00
(52) U.S. Cl. .................... 379/112; 379/200; 379/131
(58) Field of Search .................... 379/111–114, 133–134, 379/120, 128, 131, 188–189, 190, 192, 196–200

(56) References Cited

U.S. PATENT DOCUMENTS

| | | | |
|---|---|---|---|
| 3,920,936 | * | 11/1975 | Mogtader . |
| 4,198,545 | * | 4/1980 | Haist et al. .......................... 379/200 |
| 4,612,419 | * | 9/1986 | Smith . |
| 4,771,452 | * | 9/1988 | Carlson ................................ 379/190 |
| 5,062,134 | * | 10/1991 | Laird .................................... 379/190 |
| 5,200,995 | * | 4/1993 | Gaukel et al. ....................... 379/200 |
| 5,388,150 | * | 2/1995 | Schneyer et al. ..................... 379/67 |
| 5,524,145 | * | 6/1996 | Parker .................................. 379/112 |
| 5,748,718 | * | 5/1998 | Manicone ............................. 379/131 |
| 5,864,613 | * | 1/1999 | Flood ................................... 379/192 |

FOREIGN PATENT DOCUMENTS

| | | |
|---|---|---|
| 0630138A2 | 12/1994 | (EP) . |
| 2227905 | * 1/1989 | (GB) . |
| 02303252 | 12/1990 | (JP) . |

* cited by examiner

Primary Examiner—Duc Nguyen
(74) Attorney, Agent, or Firm—Dicran Halajian

(57) ABSTRACT

A telephone and a method of controlling thereof for cost control are disclosed. The telephone includes a processor that controls operation of the telephone, and a memory which stores user defined parameters used to control this operation. The parameters include call allowance categories and numbers, and call restriction categories and numbers. The call restriction categories and numbers have maximum durations independent of each other. The processor allows calls associated with the call allowance categories and numbers, and times calls associated with the call restriction categories and numbers. The processor interrupts a restricted call when one of the maximum durations associated with the restricted call is reached. Further, the processor provides an alarm prior to interruption of the restricted call. An elapsed time of the restricted call is initialized when a security code is entered prior to interruption of the restricted call. The processor also prevents calling back of a restricted call when this restricted call was the last called number.

18 Claims, 2 Drawing Sheets

| | ON/OFF | DCi | CCi | DTi | Pi | CTi | CPi |
|---|---|---|---|---|---|---|---|
| 0 | OFF | | | | | | |
| 1 | ON | 180s | . . . | 3600s | 604800s | . . . | . . . |
| 2 | ON | 300s | . . . | | | | |
| 3 | ON | 600s | . . . | | | | |
| 083615 | ON | | | 900s | 604800s | | |
| N1 | ON | | | 300s | 86400s | | |
| N2 | OFF | | | | | | |
| F1 | ON | | | | | | |
| F2 | ON | | | | | | |

T1

METHOD OF RESTRICTING THE DURATION OF TELEPHONE CALLS AND TELEPHONE IMPLEMENTING SUCH A METHOD

BACKGROUND OF THE INVENTION

The present invention relates to a telephone comprising control means for controlling the cost of telephone calls, and a method of controlling the cost of telephone calls.

The invention has highly significant applications because it permits a subscriber to a telephone network to control the cost of calls made with his telephone. The invention is particularly advantageous when it is applied to mobile telephones which, by nature, admit of being handed down to various persons.

British patent application No. 2 227 905, filed in the United Kingdom on 21.01.1989 describes a device intended to be connected in series with a telephone by the telephone line. This device makes it possible to set a maximum total amount that must not be exceeded for all the calls. It displays the current amount and when the preset maximum amount has been reached, the telephone will be cut off for outward calls. The value of the current amount may be reinitialized by means of a key.

The described mechanism has various drawbacks. First of all, it needs the use of a complementary device and is only applicable to conventional corded or cordless telephones. Moreover, it provides a rough control of the telephone cost and the restriction is imposed on the basis of the amount of the calls, which is relatively complex to manage given the variety of rates depending on the operators, hour ranges, . . .

SUMMARY OF THE INVENTION

It is an object of the invention to propose a telephone which integrates cost control means which can be adapted to the need of the user, are simpler to implement and easier to use by the telephone user.

Therefore, a telephone according to the invention and as described in the opening paragraph is characterized in that it comprises:

means permitting of laying down at least one duration restriction criterion which is independently applicable to each call, means for assigning a maximum authorized duration to each call that forms the object of such a restriction, means for permitting of interrupting a call when the maximum duration assigned thereto has elapsed.

Similarly, a method according to the invention of controlling the cost of the calls is characterized in that it comprises:

laying down at least one duration restriction criterion which is independently applicable to each call, assigning a maximum authorized duration to each call that forms the object of such a restriction, and permitting of interrupting a call when the maximum duration assigned thereto has elapsed.

According to the invention, the control of cost is thus made by laying down call duration restrictions, which is much simpler to manage. These restrictions admit of being applied on a call-by-call basis, which allows of obtaining a more efficient control.

In a particularly advantageous embodiment, a telephone according to the invention comprises means for laying down one duration restriction criterion for each category, the fact that a call belongs to one category being determined by the called party's telephone number.

The invention thus permits of restricting only certain categories of calls, or restricting the various categories differently, for example, local calls, international calls, . . .

In another advantageous embodiment of the invention, the telephone has a telephone directory containing records and it comprises means for laying down at least one duration restriction criterion for one or various records of said directory.

Advantageously, the telephone according to the invention comprises:

at least one counter, called call counter, means for initializing said call counter for each call that forms the object of a duration restriction, with the maximum authorized duration, means for decrementing said call counter for as long as the call lasts, display means for displaying the value of said call counter.

The user of the telephone thus at any time knows the duration that is left before the call is cut off, which largely improves the ease of use of the telephone.

Finally, in another advantageous embodiment, the telephone according to the invention comprises means for setting at least one time period, means for summing the durations of the calls per category in said period, means for setting a maximum authorized duration for said period, means for permitting of interrupting a call that belongs to said category when the maximum duration assigned to this category has elapsed for said period, means permitting of cutting off the calls that belong to said category when the maximum duration assigned to this category has elapsed for said period.

The summing of the duration of the calls per category and per period provides a very large flexibility of the use of the telephone. It is particularly interesting notably in a professional environment.

These and other aspects of the invention will be apparent from and elucidated with reference to the embodiments described hereinafter.

DETAILED DESCRIPTION OF THE PREFERRED EMBODIMENT

Figures 1, 2:
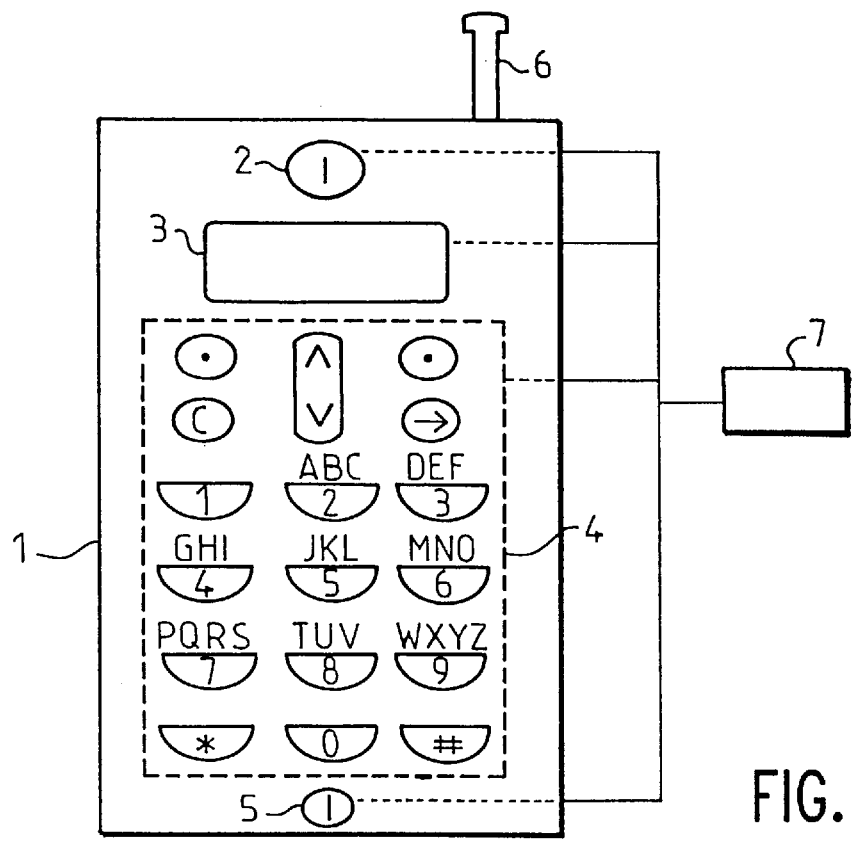
FIG. 1 represents an example of a telephone according to the invention.
FIGS. 2 and 3 represent the contents of a table in which are stored the various parameters relating to the restrictions that have been laid down.

In FIG. 1 is shown by way of example a telephone 1 according to the invention. This telephone is a mobile telephone comprising an earphone 2, a display 3, a keyboard 4, a microphone 5, an antenna 6, and a microprocessor 7 which ensures its operation and which notably permits of implementing a method according to the invention for controlling the cost of the calls. By way of example, for an analog cellular telephone according to the AMPS standard, this microprocessor assembly is advantageously formed around a 8051 microprocessor manufactured by Philips Semiconductors.

The telephone described by way of example in the following of the description includes a telephone directory stating records. The user has the disposal of two methods for sending out a call: either directly dialing the corresponding telephone number on the keyboard of the telephone, or selecting a record in the telephone directory. This telephone directory is stored in a memory unit of the microprocessor assembly 7, and the records are identified in the telephone directory by a record number.

The telephone also has various functions whose parameters are controllable by way of a menu displayed on the screen, and notably one or various functions for restricting the durations of the calls. By way of example, there will now be described the contents of a menu for restricting the duration of the calls:

| Restriction of the duration | | |
|---|---|---|
| → any call | | → duration per call |
| → per category | → international | → duration per call |
| | | → duration per period |
| | → district | → duration per call |
| | | → duration per period |
| | → local | → duration per call |
| | | → duration per period |
| → numbers | | → duration per call |
| | | → duration per period |
| → exception | → number | |
| → alarm | → yes/no | |
| | → time | |
| → display during call | | → time left |
| | | → elapsed time |

In this example, the user thus has the choice of laying down various criterions with respect to restriction of the duration of a call. These criterions admit of being laid down for each call independently, while taking into account the category to which the call belongs, the fact whether the call belongs to a certain category (local, district, international, . . . ) being determined by the called party's telephone number. The restrictions defined per category admit of being applied on a call-by-call basis, or applied to the summed durations of the calls of the category during a period set by the user (day, week, month, for example). Similarly, the user has the possibility of defining one or various numbers to which a specific restriction applies on a call-by-call basis, or for the summed durations of the calls for a period that has been set.

By way of example, the user thus has the possibility of laying down the following restrictions:

3 mn for each international call 1 h weekly for the international calls 5 mn for each district call 10 mn for each local call 15 mn weekly for 08 36 15 numbers 5 mn daily for number N1 . . .

This menu also provides the possibility of defining one or various telephone numbers to which the restrictions are not applied (for example, the 0800 numbers, the telephone number of the house . . . ).

This menu also permits of providing an alarm signal transmitted a certain period of time before a call is interrupted, to warn the user. In an advantageous embodiment of the present invention, the user thus has the possibility of dialing a security code (which is a secret code chosen by the user) so as to inhibit or reinitialize the current restriction.

Finally, this menu allows of choosing the type of display desired by the user: display of the time left or the elapsed time for the current call. The summed durations of the calls per category are, for example, accessible via a "counter" menu of the telephone.

According to certain standards (notably in the analog cellular telephone standard AMPS), the calls are billed at the point of the transmitter and of the receiver. Such a menu is thus advantageously defined for incoming and outgoing calls.

In an advantageous embodiment, the access to such a menu is protected, because it is necessary to dial the security code first.

The information thus dialled by the user is automatically stored in the form of tables or variables in the memory of the microprocessor 7.

A table T1 indicates for each type of restriction i:

the active or inactive state of the restriction, the maximum authorized duration $DC_i$ per call, a counter $CC_i$ which indicates the time left for the current call, the approximate duration $DT_i$ per category, the period $P_i$ defined for the category, a duration counter $CT_i$ which indicates the time left for the current period, a period counter $CP_i$ which computes the part of the period $P_i$ that is still left.

In FIG. 2 such a table is represented which corresponds to the example described on pages 4 and 5: the first four lines of the table correspond to the restrictions per call, and to the restrictions per category: international, district, local, respectively. The table T1 moreover contains restrictions defined for telephone numbers N1, N2 . . . and/or for record numbers F1, F2 . . . of the telephone directory.

Figures 3, 4:
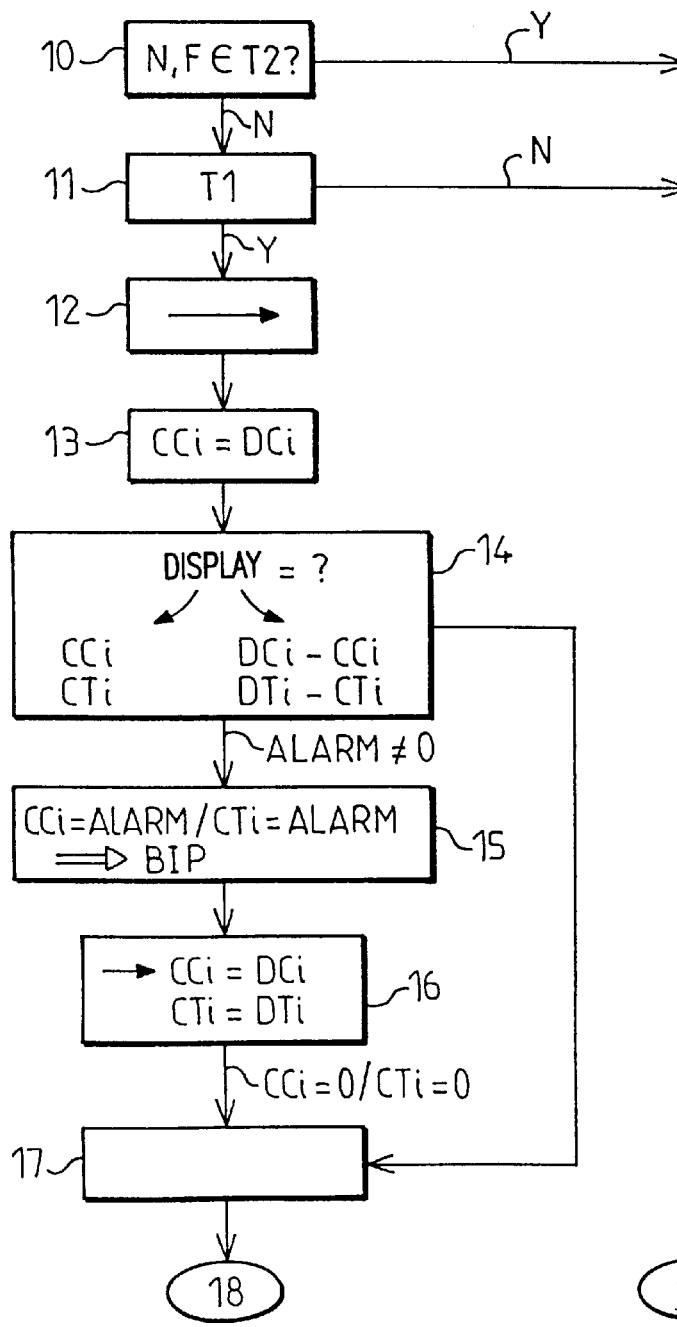
FIG. 4 represents an embodiment of a method according to the invention in the form of a flow chart.

In FIG. 3 is shown a table T2 which contains the list of the telephone numbers N3, N4 and/or of the record numbers F3, F4 of the telephone directory, which are defined as exceptions to which no restriction is to be applied.

Moreover:

A variable ALARM indicates the time that is to separate the possible transmission of an alarm signal for the interruption of the call. If this variable has a zero value, no alarm signal is sent.

Finally, a binary variable DISPLAY indicates the type of display chosen by the user (time left or elapsed time).

The method according to the invention notably uses a task called timer task and a task called management task for managing the duration of the calls. The timer task utilizes an internal timer which the telephone according to the invention has for automatically updating the values of the counters $CC_i$, $CT_i$, $CP_i$ of table T1. This task makes it also possible to reinitialize the counters $CT_i$ and $CP_i$ when the counter $CP_i$ has a time-out.

However, in the case where no restriction per period is defined, this internal timer is not necessary. The processor of the telephone has in fact a cyclic task which gives the elapsed time when the telephone is switched on.

In FIG. 4 are shown in the form of a flow chart and by way of example the steps of the management task for managing the duration of the calls.

This task is activated when the user dials the telephone number N or selects a record F from the telephone directory. In box 10 one verifies whether this number or this record is present in table T2. In that case (branch Y in the Figure) the operation is proceeded with box 19. If not (branch N in the Figure), it is proceeded with box 11.

In box 11, the restrictions applicable to this number or to this record are determined by reading the contents of table T1 and, when a telephone number is concerned, considering the format of this number. If no restriction is activated (branch N), the operation is carried on with box 19. If not (branch Y), it is carried on with box 12.

In box 12, one waits for the detection of the setting up of the call with the called party. Such a detection is realized, for example, as described in French patent application filed under No. 9608621 by the applicants on Jul. 10, 1996. The moment the call set-up has been detected, the operation is proceeded with box 13.

In box 13, the counter $CC_i$ is initialized: $CC_i=DC_i$. Then, in box 14, the display mode requested by the user is verified. Depending on the value of the variable DISPLAY, either the value of the counters $CC_i$ and $CT_i$, or the values $DC_i-CC_i$ and $DC_i-CT_i$ is or are thus displayed permanently. The operation is then carried on with box 15 if the value of the variable ALARM differs from zero. If not, the operation is carried on with box 17.

In box 15, the moment either counter $CC_i$ or $CT_i$ has reached the ALARM value, an alarm signal is sent. The operation is proceeded with box 16. In box 16, if the user dials his security code, the counters $CC_i$ and $CT_i$ are reinitialized: $CC_i=DC_i$ and $CT_i=DT_i$. The moment one of the counters $CC_i$ or $CT_i$ has elapsed, the operation is proceeded with box 17.

In box 17, the current call is interrupted. The operation is then terminated in box 18.

In box K18, an information message is displayed.

In box K19, the call is transmitted and handled in the conventional manner.

In an advantageous embodiment of the invention, means are provided for blocking the calling-back of a number for which the call has been interrupted. Therefore, when a number has been requested, it is verified whether this number forms part of the list of numbers called last. If this is the case, the call will not be transmitted.

The invention is not restricted to the embodiment which has just been described by way of example. It notably applies to any type of telephone. The invention admits of implementing one or various criterions of call duration restriction from those that have just been described.

What is claimed is:

1. A telephone comprising:

a processor which controls operation of said telephone;

a memory which stores user defined parameters used to control said operation of said telephone; and a display which displays a menu;

said parameters including call allowance categories and numbers, and call restriction categories and numbers, said call restriction categories and numbers having maximum durations independent of each other;

said processor allowing calls associated with said call allowance categories and numbers, and timing restricted calls associated with said call restriction categories and numbers;

said processor interrupting said restricted calls when one of said maximum durations associated with said restricted calls is reached;

said menu including at least one of said call allowance categories and numbers, said call restriction categories and numbers, said maximum durations, an elapsed time of said restricted call and a remaining allowed duration of said restricted call.

2. The telephone of claim 1, wherein said processor prevents calling back of said restricted call if said restricted call has been interrupted.

3. The telephone of claim 1, wherein said processor blocks calling back of said restricted call when said restricted call is part of a list of numbers called last.

4. The telephone of claim 1, wherein said call restriction categories comprise at least one of any calls not included in said call allowance categories, international calls, long distance calls, regional calls and local calls.

5. The telephone of claim 1, wherein said processor verifies whether a dialed number is part of said call allowance categories and numbers, and if said dialed number is not part of said call allowance categories and numbers, then said processor determines whether said dialed number is part of said call restriction categories and numbers.

6. The telephone of claim 1, wherein said processor initializes an elapsed time of said restricted call when a security code is dialed prior to interruption of said restricted call.

7. The telephone of claim 1, wherein said processor provides an alarm prior to interruption of said restricted call.

8. A telephone comprising:

processor means for controlling operation of said telephone;

storage means for storing user defined parameters used to control operation of said telephone; and display means for displaying a menu;

said parameters including call allowance categories and numbers, and call restriction categories and numbers, said call restriction categories and numbers having maximum durations independent of each other;

said processor means allowing calls associated with said call allowance categories and numbers, and timing calls associated with said call restriction categories and numbers; and said processor means interrupting a restricted call when one of said maximum durations associated with said restricted call is reached;

said menu including at least one of said call allowance categories and numbers, said call restriction categories and numbers, said maximum durations, an elapsed time of said restricted call and a remaining allowed duration of said restricted call.

9. The telephone of claim 8, wherein said processor means prevents calling back of said restricted call if said restricted call has been interrupted.

10. The telephone of claim 8, wherein said processor means blocks calling back of said restricted call when said restricted call is part of a list of numbers called last.

11. The telephone of claim 8, wherein said processor means verifies whether a dialed number is part of said call allowance categories and numbers, and if said dialed number is not part of said call allowance categories and numbers, then said processor means determines whether said dialed number is part of said call restriction categories and numbers.

12. A method of controlling a telephone comprising:

storing parameters used to control operation of said telephone; said parameters including call allowance categories and numbers, and call restriction categories and numbers, said call restriction categories and numbers having maximum durations independent of each other;

displaying a menu;

allowing calls associated with said call allowance categories and numbers;

timing calls associated with said call restriction categories and numbers; and interrupting a restricted call when one of said maximum durations associated with said restricted call is reached;

said menu including at least one of said call allowance categories and numbers, said call restriction categories and numbers, said maximum durations, an elapsed time of said restricted call and a remaining allowed duration of said restricted call.

13. The method of claim 12, further including preventing call-back of said restricted call if said restricted call has been interrupted.

14. The method of claim 12, further including blocking call-back of said restricted call when said restricted call is part of a list of numbers called last.

15. The method of claim 12, wherein prior to the allowing act, the method further includes verifying whether a dialed number is part of said call allowance categories and numbers; and if said dialed number is not part of said call allowance categories and numbers, then determining whether said dialed number is part of said call restriction categories and numbers.

16. The method of claim 12, wherein said call restriction categories comprise at least one of any calls not included in said call allowance categories, international calls, long distance calls, regional calls and local calls.

17. The method of claim 12, further including initializing an elapsed time of said restricted call when a security code is dialed prior to interruption of said restricted call.

18. The method of claim 12, further including providing an alarm prior to interruption of said restricted call.

* * * * *